United States Patent [19]

Olliver et al.

[11] Patent Number: 4,965,628
[45] Date of Patent: Oct. 23, 1990

[54] PHOTOGRAPHIC FILM WITH LATENT IMAGE MULTI-FIELD BAR CODE AND EYE-READABLE SYMBOLS

[75] Inventors: Richard Olliver; Cortlandt E. Johnson, both of Rochester; David L. Patton, Webster, all of N.Y.

[73] Assignee: Eastman Kodak Company, Rochester, N.Y.

[21] Appl. No.: 372,973

[22] Filed: Jun. 28, 1989

[51] Int. Cl.⁵ .......................................... G03B 27/52
[52] U.S. Cl. ....................................... 355/41; 355/68
[58] Field of Search ..................... 355/38, 40, 41, 68

[56] References Cited

U.S. PATENT DOCUMENTS 4,707,120  11/1987  Yamamoto .......................... 355/38

FOREIGN PATENT DOCUMENTS 63-305336  12/1988  Japan .................................. 355/41
63-305337  12/1988  Japan .................................. 355/41

Primary Examiner—L. T. Hix
Assistant Examiner—D. Rutledge
Attorney, Agent, or Firm—James A. Smith

[57] ABSTRACT

A multi-field latent image bar code is photographically recorded in every half frame of a strip of photographic film, at least one of the fields of the code representing information pertaining to film type and another one of the fields representing the half-frame number.

4 Claims, 4 Drawing Sheets

DX CODE

FRAME NO.

DX CODE

PHOTOGRAPHIC FILM WITH LATENT IMAGE MULTI-FIELD BAR CODE AND EYE-READABLE SYMBOLS

TECHNICAL FIELD

This invention relates to photographic film manufactured with latent images photographically exposed along the film edges, including bar codes.

BACKGROUND OF THE INVENTION

Referring to FIG. 1, a strip of photographic film must convey a significant amount of information to the photofinisher in order to take advantage of certain automated cost-saving features which enable the photofinisher to process the film at a reduced cost. For manually operated photofinishing machines, the top edge of the film includes sufficient eye-readable information to enable the operator to properly print the film. Specifically, in the example of FIG. 1, the eye-readable information on the top edge of the film includes the manufacturer's name, the type of film, the speed of the film, and a number assigned by the film manufacturer designating the type of film. For automated photofinishing machines, a so-called "DX" bar code is provided along the bottom edge of the film between every half frame number. The half frame numbers are, for example, 1, 1A, 2, 2A, etc. The DX bar code, which is between each of these numbers, specifies the National Association of Photographic Manufacturers (NAPM) number (designating the film type) and generation number printed in eye-readable form on the top edge. Automatic photofinishing machines, prior to printing the film, carefully guide the bottom edge of the film past an optical bar code reader in order to extract the information necessary to determine the film type. The DX bar code illustrated in the bottom edge of the film strip in FIG. 1 is printed every half frame in order to avoid such information being lost upon the film strip being notched by a notching machine. Typically, a notching machine places a notch along one edge of the film to delineate frame locations. Thus, a notch will appear along one edge of the film at every frame. If the bottom edge of the film is selected for notching, the notches may make unreadable every other one of the bar code patterns along the bottom edge.

A significant problem exists in reordering prints. A customer must specify to the photofinisher which frame on the strip of film should be reprinted. Thus, the customer must select the correct half frame number. This creates significant ambiguities, particularly in those cases where the customer is unfamiliar with the frame number format of film. Such ambiguities can result in the customer being furnished reprints of the wrong frames. In order to overcome this problem, it has been proposed to provide a bar code with every frame specifying the frame number. The bar code can be automatically read at the time the first print is made so that a frame number is automatically associated with each print made from the strip of film. Such information can be used in order to assure that the customer's desire is always met and to eliminate any potential ambiguities. Such a proposal is illustrated in FIG. 2, and in Japanese patent application No. 63-305337. The DX bar code lies along the bottom edge of the film strip and a frame number bar code lies along the top edge of the film strip at every frame.

As shown in FIG. 2, this presents a problem, in that the eye-readable information along the top edge of the film must be compressed within a smaller area. The disadvantage is that the minilab photofinishing operators must now glean their information from smaller eye-readable characters. An additional problem arises because it is desirable to provide eye-readable half-frame numbers not only along the bottom edge of the film strip but also full-frame numbers along the top edge, as illustrated in FIG. 2. This feature is particularly helpful to manually operated photofinishing equipment, enabling the photofinishing operator to obtain all the necessary information by reading the top edge of the film only. Unfortunately, this feature further reduces the space available for the other eye-readable symbols.

Another disadvantage to the format illustrated in FIG. 2 is that the automated photofinishing lab must have two bar code readers, one for the top edge and one for the bottom edge, adding a significant expense. Moreover, reading bar codes on both opposing edges of the film requires carefully guiding both edges past the two bar code readers. While it is possible to carefully guide one edge of the film past the bar code reader, significant problems are encountered in trying to simultaneously guide both edges of the film past top and bottom bar code readers.

Finally, it is conventional when reprinting the film or in making over poor prints, to mount the film strip in a continuous web, which permits the operator to handle the film strip without touching the film itself. Such a web, as is well-known in the art, covers one of the film edges. In the film strip illustrated in FIG. 2, the operator would have to select one or the other of the two bar codes to be covered up by the web, preventing its being read upon the film being fed into automatic printing apparatus, a significant disadvantage.

One solution to the foregoing problems may be to move all bar codes to one edge of the film, the opposite edge of the film being dedicated to eye-readable information only. Such a technique is illustrated in FIG. 3. In the film strip 300 of FIG. 3, the so-called "DX" bar code 305 is accommodated every half frame while the frame number bar code 310 is accommodated in alternate half frames. This leaves plenty of room along the top edge of the film 300 for the eye-readable information, including the manufacturer's code number, the frame number, the manufacturer's name, the film type, the film speed and the generation. In this example the manufacturer's code number is 5097, the frame number is 4, the manufacturer is Kodak, the film type is Gold, the film speed is 400 and the generation is 1. The solution proposed in FIG. 3 suffers from the significant disadvantage that the DX and frame number bar codes each appear only once each frame. Thus, if the automatic printing machinery notches the film strip 300 along its bottom edge, there is a significant probability that either the DX code bar code or the frame number bar code will be rendered unreadable in every single frame. As mentioned previously, automatic notching machinery typically removes a notch from one edge of the film to delineate the location of each frame. Thus, a notch 315 (illustrated in dashed line in FIG. 3) would render unreadable the DX bar code or, alternatively, would render unreadable the frame number bar code in every frame, depending upon its placement. Thus, the proposed solution of FIG. 3 is really no solution at all.

In summary, the state of the art has been such that one could not provide an automatically readable bar coded frame number on film without suffering from either one of two disadvantages. On the one hand, if the DX bar code and the frame number bar code are placed on opposite edges of the film, a web used for automatic printing of the film during reprint or makeover printing will prevent one or the other of the two bar codes from being read automatically in a large automatic photofinishing machine, a significant disadvantage. On the other hand, if both bar codes are placed along the same edge of the film, then there is not enough room along that one edge in which to provide both bar codes every half frame. Accordingly, notching of that edge of the film by an automatic photofinishing notching device can render unreadable all bar coded frame numbers on that strip of film. Either disadvantage is unacceptable. Accordingly, there is a great need in the art for a way in which to provide machine-readable bar coded frame numbers on the film without suffering from either of the alternative disadvantages discussed above.

SUMMARY OF THE INVENTION

The foregoing problems are overcome in the invention, namely the improvement in a photographic film strip in which the top edge of the film strip is dedicated to optically recording latent eye-readable images representing the information required for manual film printing while the bottom edge of the film is dedicated to the optical recording of the latent image of a multi-field bar code every half frame as well as half frame numbers separating successive ones of the multiframe bar code images. Each multiframe bar code image is divided into plural fields, different ones of the fields having a predetermined number of bits and representing a different category of information. In one embodiment of the invention, the first field is a clock entry pattern, the second field is a seven-bit number representing the film product class, the third field is a four-bit number specifying the generation of the film, the fourth field is a seven-bit number specifying the frame number adjacent the bar code, the fifth field is a one-bit number representing the parity of the combination of the foregoing fields, while the sixth field is a clock exit pattern. The advantage of the invention is that the frame number is incorporated as part of the same bar code which includes all the information formerly recorded in the DX bar code, saving space and reducing the data overhead required to record all of the foregoing information. Such overhead includes the clock entry pattern, the clock exit pattern and the parity bit, for example. The reduction of space required to record the information in the form of a bar code reduces the overall length of each bar code pattern, allowing the multi-field bar code pattern of the invention to be recorded once every half frame. This in turn prevents a high speed film printing device from notching out every single one of the frame numbers, a significant problem. Instead, in the invention it is assured that at least alternate ones of the multi-field bar code images will always be readable notwithstanding the presence of high speed printer notches along the bottom edge of the film so that the missing ones may be reconstructed by interpolation.

DESCRIPTION OF THE DRAWINGS

The invention is described in detail with reference to the accompanying drawings, of which.

DETAILED DESCRIPTION

Figure 4:
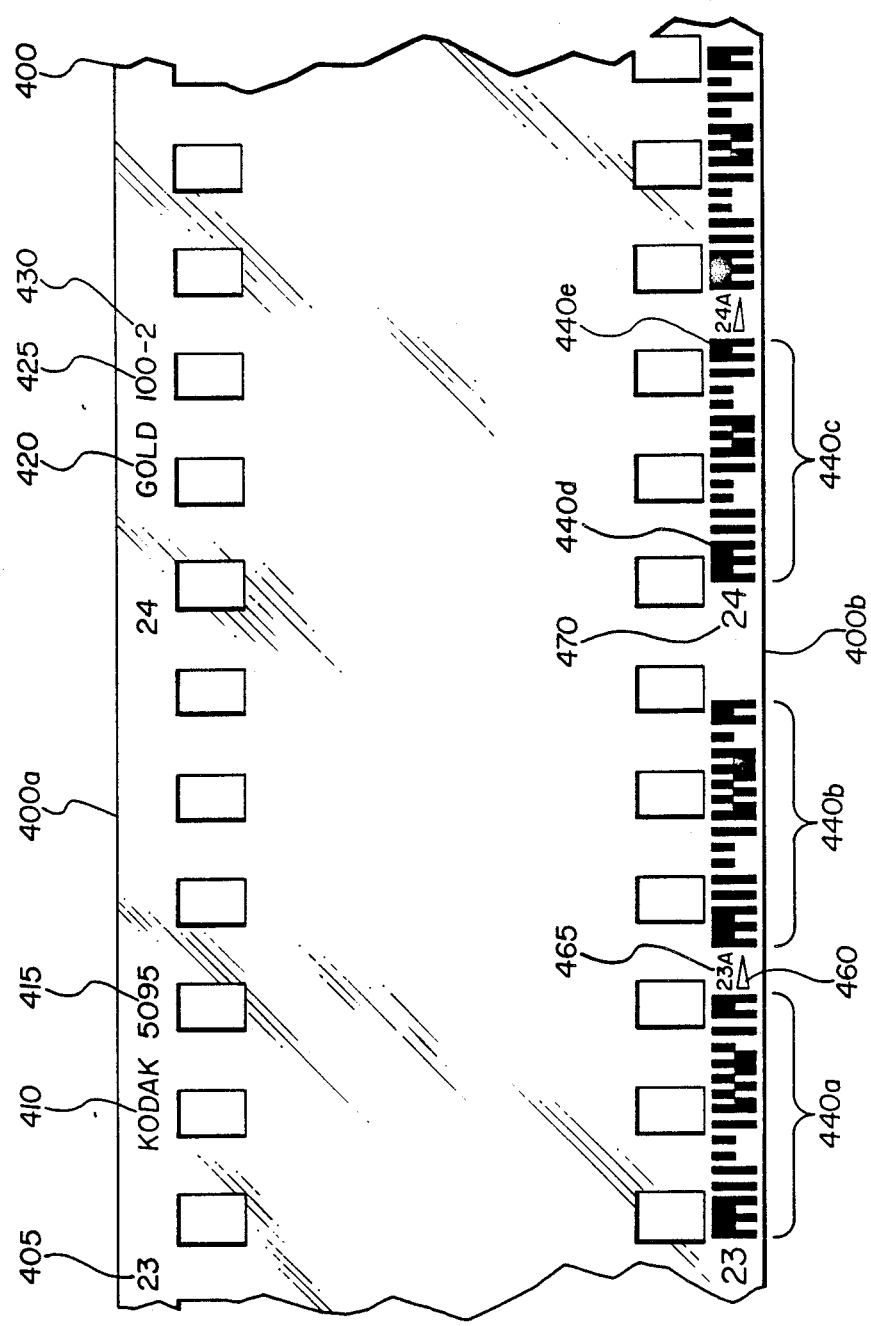
FIG. 4 illustrates the latent images recorded on a film strip of one embodiment of the present invention.

Referring to FIG. 4, in accordance with the invention, an elongate strip of photographic film 400 is furnished to the customer after latent images are photographically recorded along opposite edges 400a, 400b of the film. Along the top edge 400a, a latent optical image is photographically recorded including symbols 405 representing each frame number, symbols 410 representing the manufacturer, symbols 415 representing the manufacturer's code number of the film, symbols 420 representing the type of film, symbols 425 representing the film speed and symbols 430 representing the generation of the film manufacturer. All of the foregoing symbols are eye-readable in order to enable the manual Printing of film in a minilab by a human operator.

Figure 1:
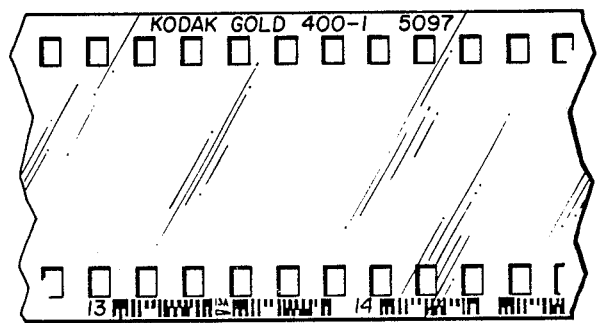
FIG. 1 illustrates the latent images recorded on a film strip of the prior art.
Figure 2:
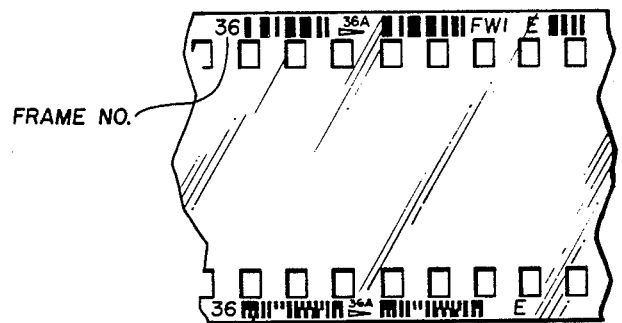
FIG. 2 illustrates the latent images recorded on another film strip of the prior art.

In addition to the eye-readable symbols recorded along the top edge 400a, successive multiframe latent bar code images are photographically recorded along the bottom edge 400b. Plural multi-frame bar codes 440a, 440b, 440c, etc., are recorded in a succession along the bottom edge 400b of the film strip 400. Each individual one of the multiframe bar codes 440a, etc., comprises six separate fields representing six distinct categories of information. Two of the categories comprise the information represented in the conventional DX bar code illustrated in FIG. 1. Another one of the categories of information is the frame number. The location of each of these categories in the respective fields of each multi-field bar code 400a, 400b, 400c, etc., will be discussed below in greater detail in connection with FIG. 5.

A significant advantage of the invention illustrated in FIG. 4 is that all of the foregoing information is contained within a relatively short bar code sequence, so that each latent bar code image is less than half a frame in length. Accordingly, each latent bar code image may be recorded every half frame, as illustrated in Fig. 4. In other words, each frame on the film 400 has within it two multi-field latent bar code images, such as the bar code images 440a and 440b in frame 23. In addition, successive bar code images within each frame are separated by an eye-readable symbol comprising an orientation arrow 460 and a half frame number 465. Successive bar code images in different adjacent frames are separated by a full frame number 470.

Because two bar code images are recorded every frame, the invention is not susceptible to information being lost by periodic notching of the bottom film edge 400b in a high speed film notching device. This contrasts favorably with the technique illustrated in FIG. 3.

Figure 3:
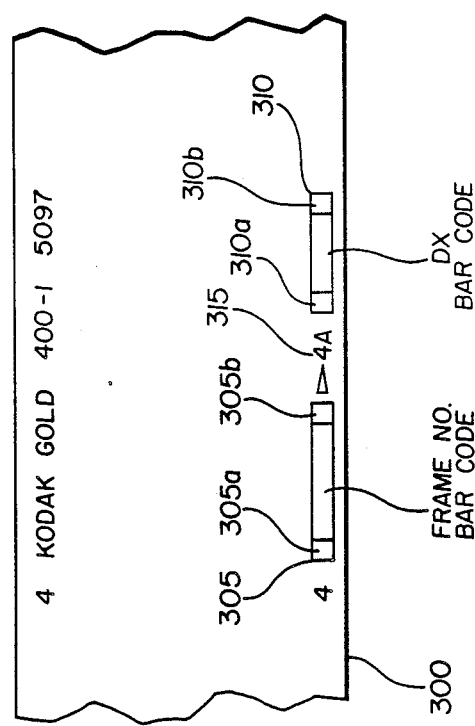
FIG. 3 illustrates the latent images recorded on a proposed film strip format.

One reason that two multi-field bar code images which include both the film identifier information and the frame number may be recorded every half frame while the separate DX bar code and frame number bar codes of FIG. 3 were recorded only once every frame will now be explained. In FIG. 3, the DX bar code 305 includes overhead information, including a clock start symbol 305a and a clock stop signal 305b. Likewise, the frame number bar code 310 requires its own clock start symbol 310a and its clock stop signal 310b. Finally, a quiet zone 315 must separate the successive bar codes 305, 310. Returning to the invention illustrated in FIG. 4, the multiframe bar code has all the information represented in both the DX bar code and the frame number bar code of FIG. 3 but less overhead is required. Specifically, referring to the multi-field latent image bar code 440c in FIG. 4, only one clock start symbol 440d and only one clock stop signal 440e are required in comparison with the two pairs of clock start and clock stop signals of FIG. 3. Furthermore, the quiet zone 315 of FIG. 3 is eliminated in FIG. 4.

Figure 5:
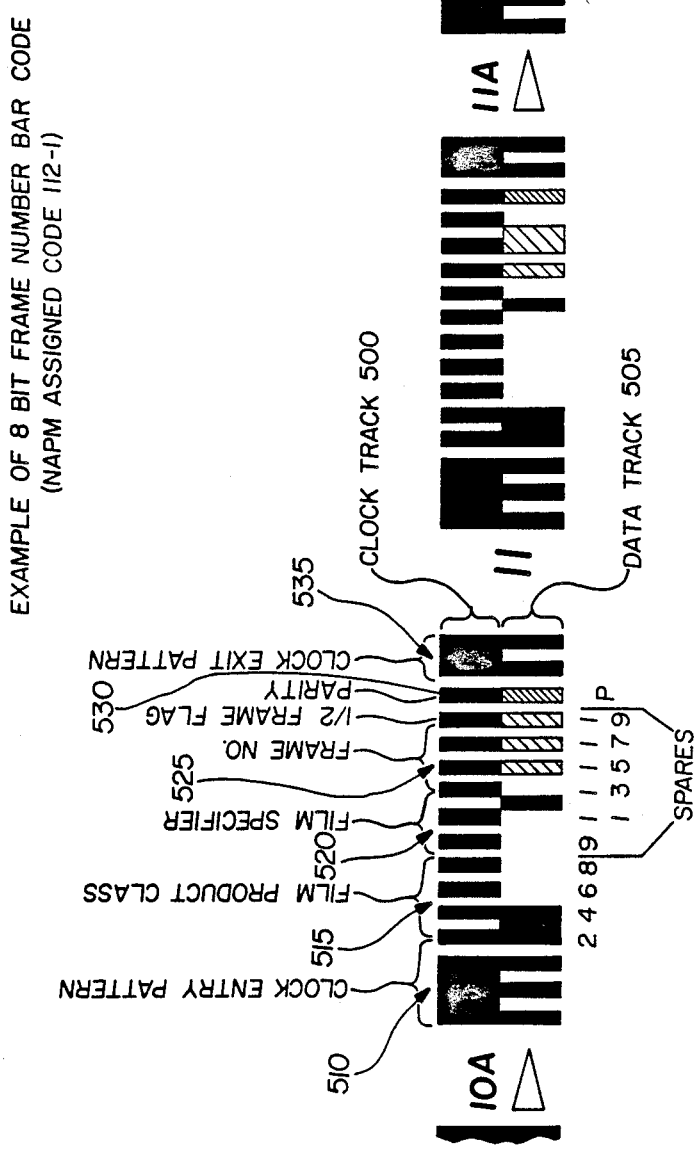
FIG. 5 is a detailed view of the bar codes illustrated in FIG. 4.

Referring to FIG. 5, the multi-field latent image bar code 440c of FIG. 4, for example, is divided into six fields in the preferred embodiment illustrated in FIG. 5. The bar code consists of a clock track 500 and a data track 505 extending parallel with the clock track, in accordance with well-known techniques. The first field 510 constitutes a clock entry pattern. The next field 515 constitutes a field of binary bits defining the product code number. The next field 520 comprises four binary bits defining the generation code or film specifier number. (The product code and the generator number together comprise the NAPM number.) The next field 525 constitutes seven bits defining the frame number. The frame number is defined as half frame intervals. Therefore, in the preferred embodiment, for a film roll having 36 exposures, there will be 72 frame numbers. The next field 530 comprises a parity bit. The last field 535 constitutes a clock exit pattern.

The advantages of the invention are that the film may be handled on its top edge using an opaque web and the like while leaving the bottom film edge 400b free so that both the NAPM number and the frame number may easily be read using automatic bar code readers. The second advantage is that approximately two bar-coded frame numbers appear in each frame, so that notching each frame in a high speed notcher cannot delete all bar-coded frame numbers. Another advantage of the invention is that only a single bar code reader is required in the photofinishing equipment to read both the NAPM number and the frame number, a significant advantage.

While the invention has been described in detail by specific reference to preferred embodiments thereof, it is understood that variations and modifications may be made without departing from the true spirit and scope of the invention.

What is claimed is:

1. In a strip of photographic film susceptible of photographically recording an ordered succession of image frames therein between opposing longitudinal edges thereof, the improvement comprising:
a succession of images recorded along one of said longitudinal edges, each of said images representing a bar code binary sequence comprising plural fields, said plural fields comprising a clock start pattern, a clock stop pattern and a first field comprising binary bits representing the type of said film and a second field comprising binary bits representing a frame number, said first and second fields lying between said clock start pattern and said clock stop pattern.

2. In a method for manufacturing photographic film susceptible of photographically recording a succession of image frames therein, the improvement comprising:
recording a succession of latent images along one longitudinal edge of said film, each of said latent images comprising a bar code comprising a plurality of individual fields therein, said fields in each of said images including a clock start pattern and a clock stop pattern, said fields further including first and second information fields between said clock start patterns and said clock stop patterns, said first field comprising binary bits representing the type of said film and said second field comprising binary bits representing a frame number corresponding to one of said frames which is adjacent a corresponding set of said images, wherein said method comprises recording each one of said images twice for each one of said frames.

3. The method of claim 2 further comprising changing said frame number as each one of said images is recorded so that each frame number represents the true frame number position on said film, all of said frame numbers constituting an ordered numerical sequence.

4. The method of claim 2 further comprising recording eye-readable symbols representing the film type and frame number along the opposite edge of said film.

* * * * *